Nov. 26, 1946.  W. J. VINCENT ET AL  2,411,766
ANIMAL TRAP
Filed May 24, 1943  10 Sheets-Sheet 1

INVENTORS
William J. Vincent
Cornelius M. Stanton
BY
their Attorney

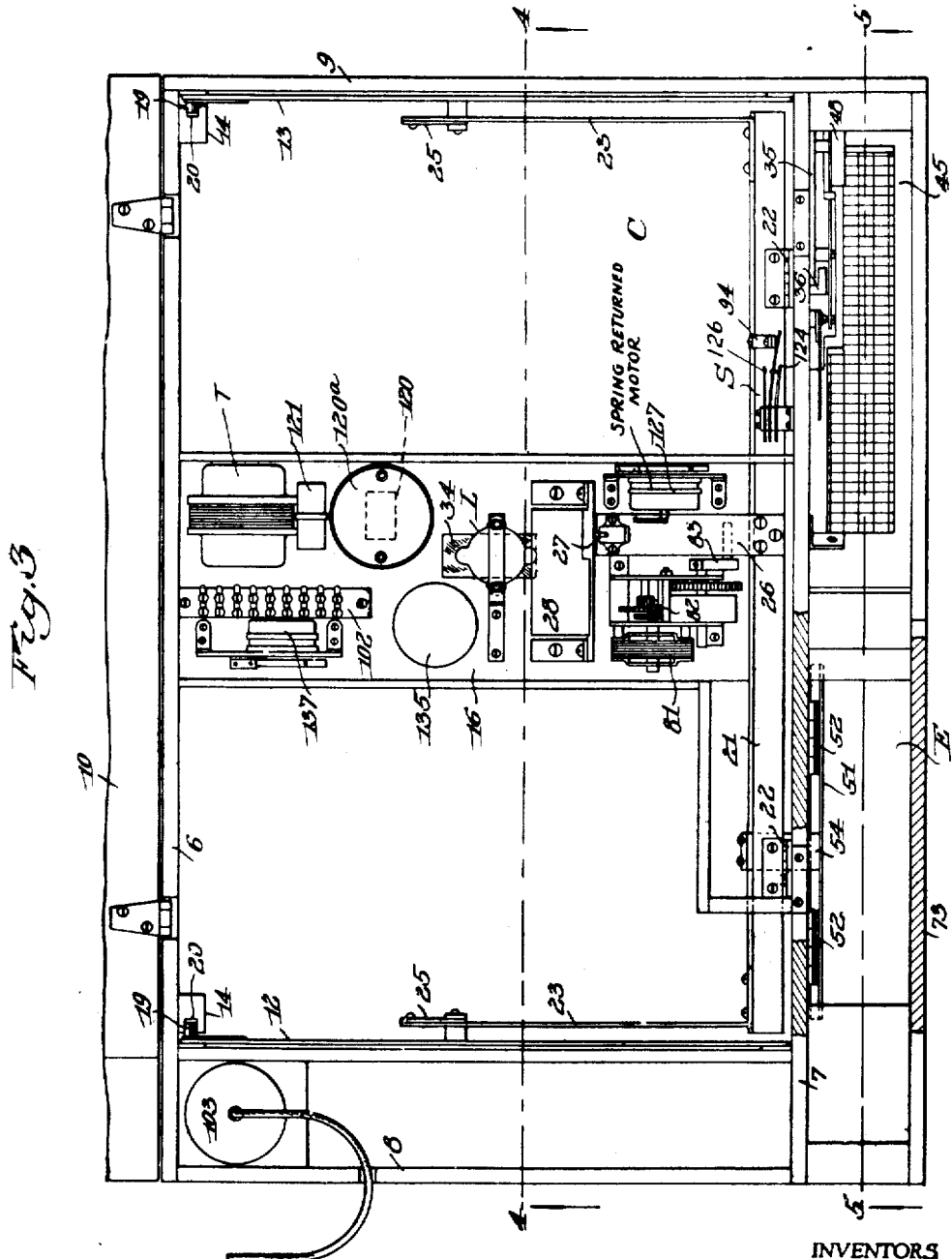

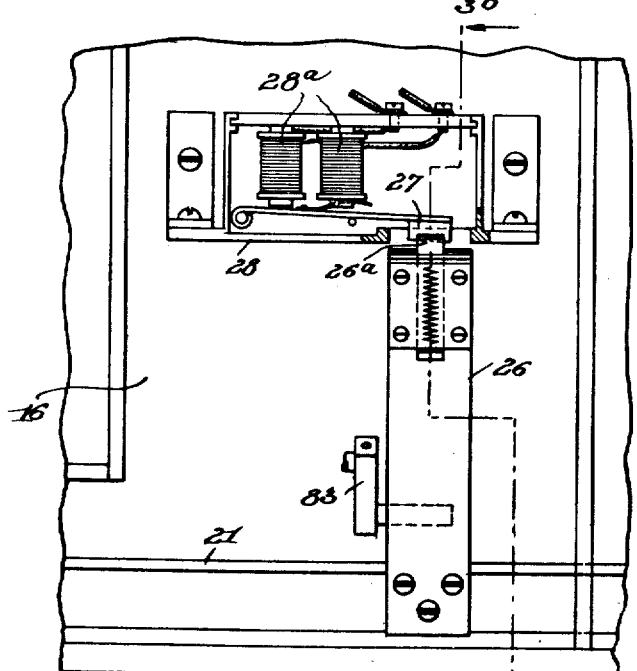
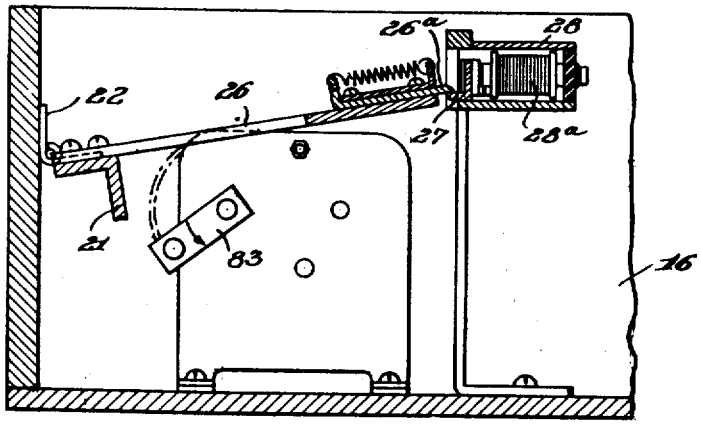

Nov. 26, 1946.　　W. J. VINCENT ET AL　　2,411,766
ANIMAL TRAP
Filed May 24, 1943　　10 Sheets-Sheet 4
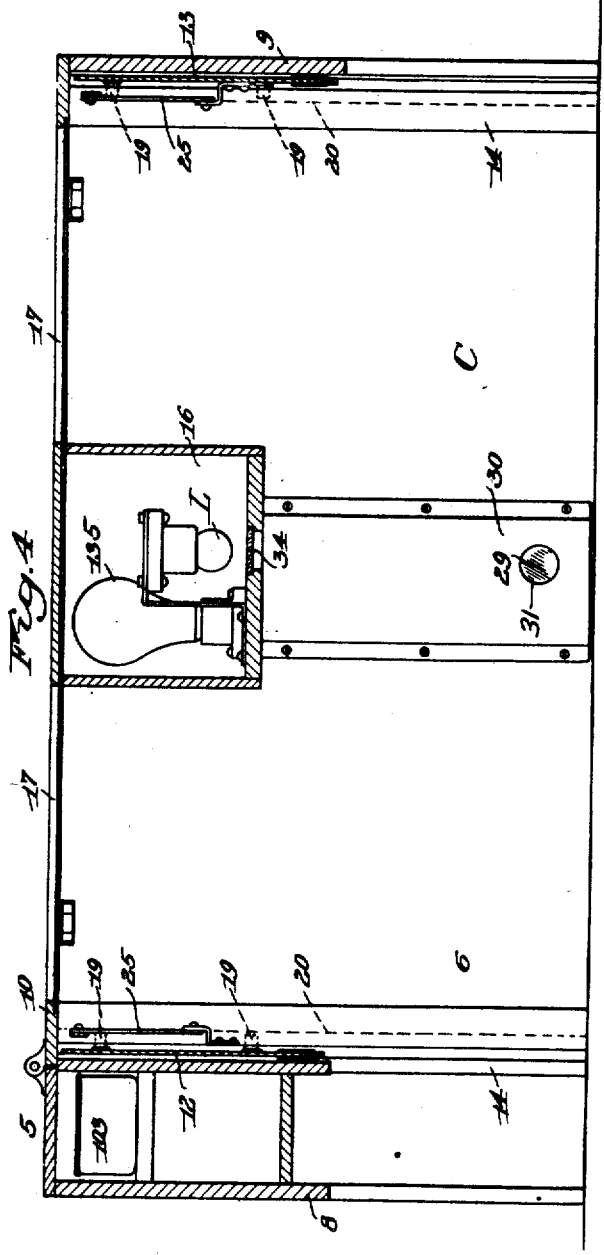
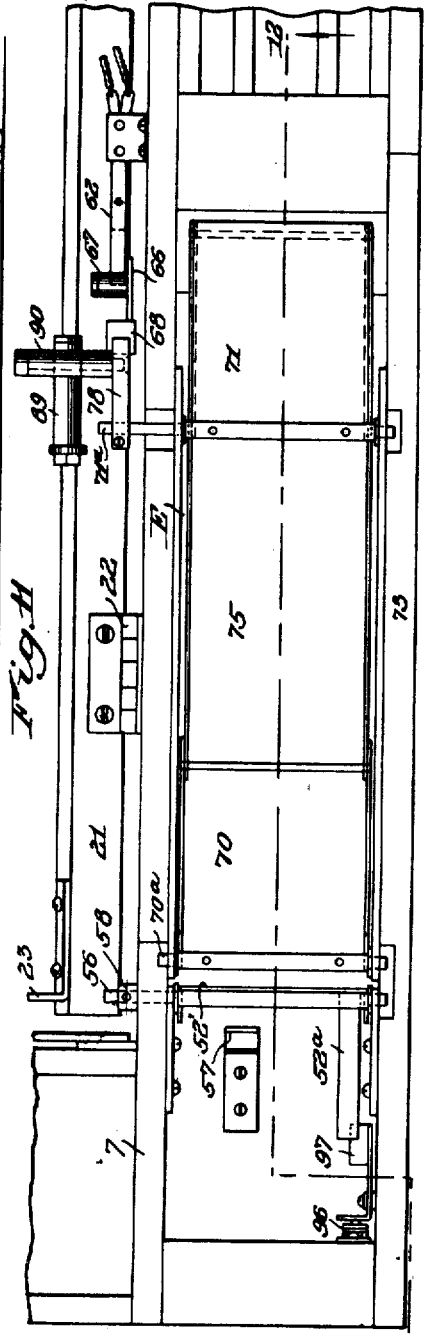
INVENTORS
William J. Vincent
Cornelius M. Stanton
D. Clyde Jones
their ATTORNEY.

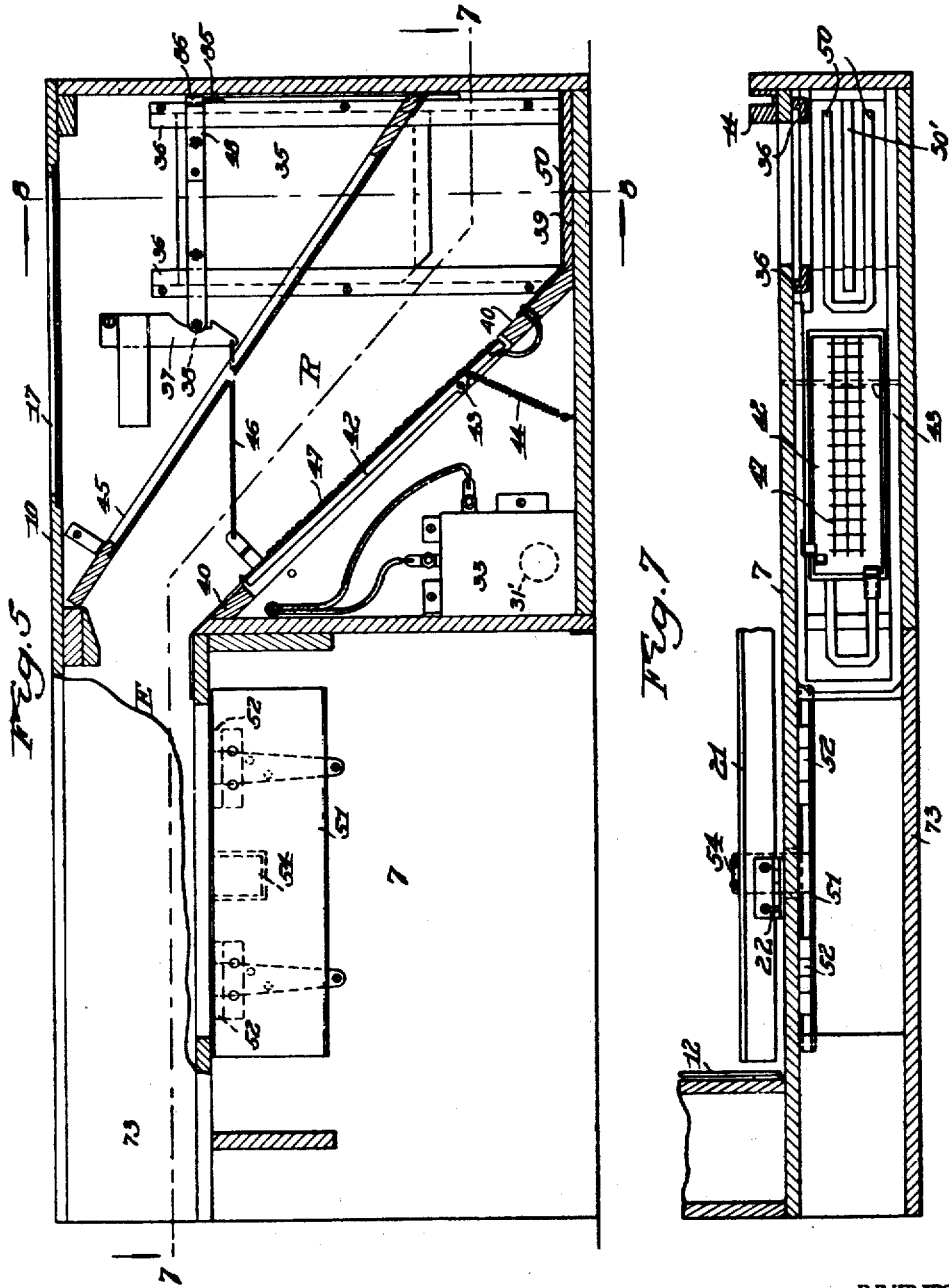

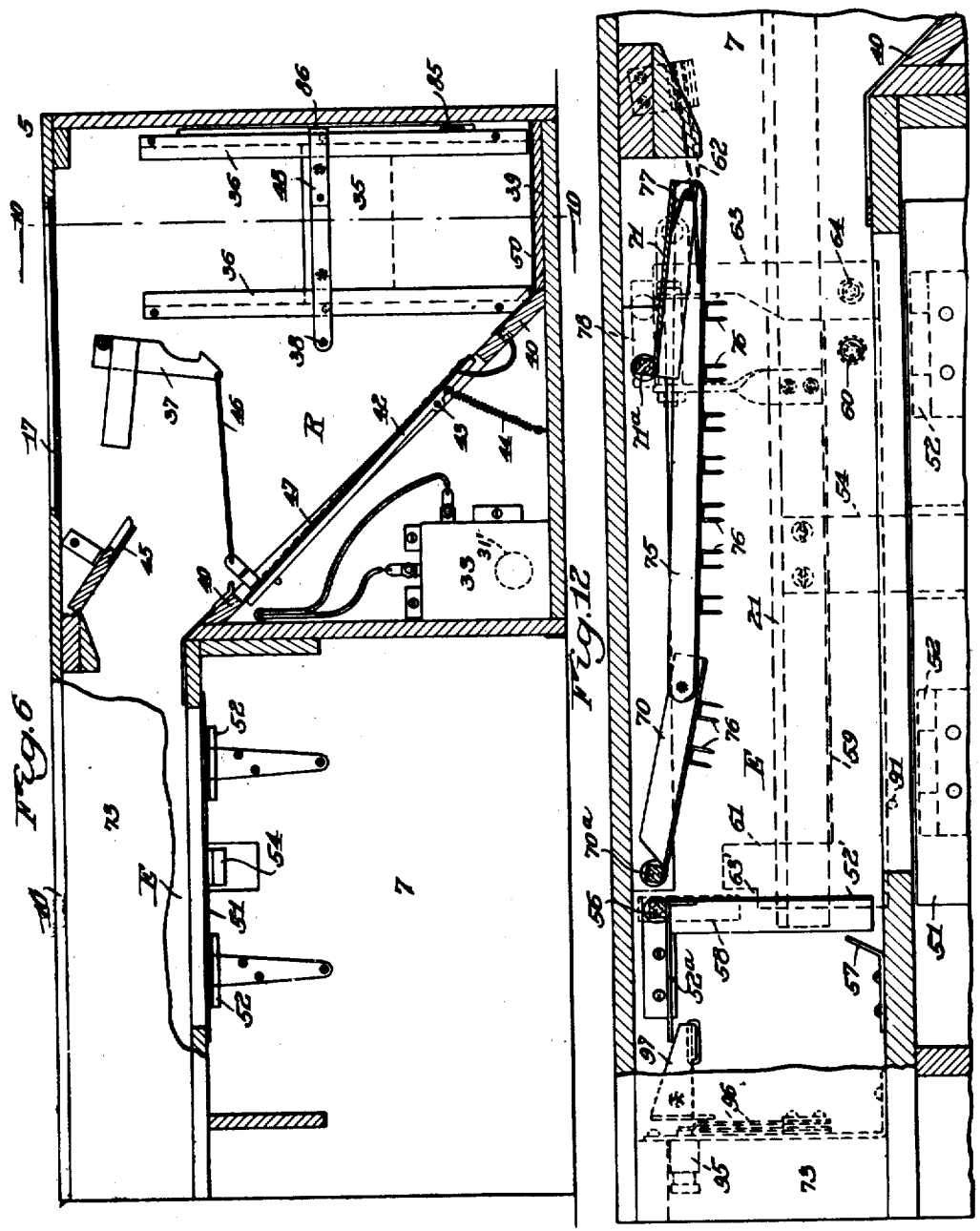

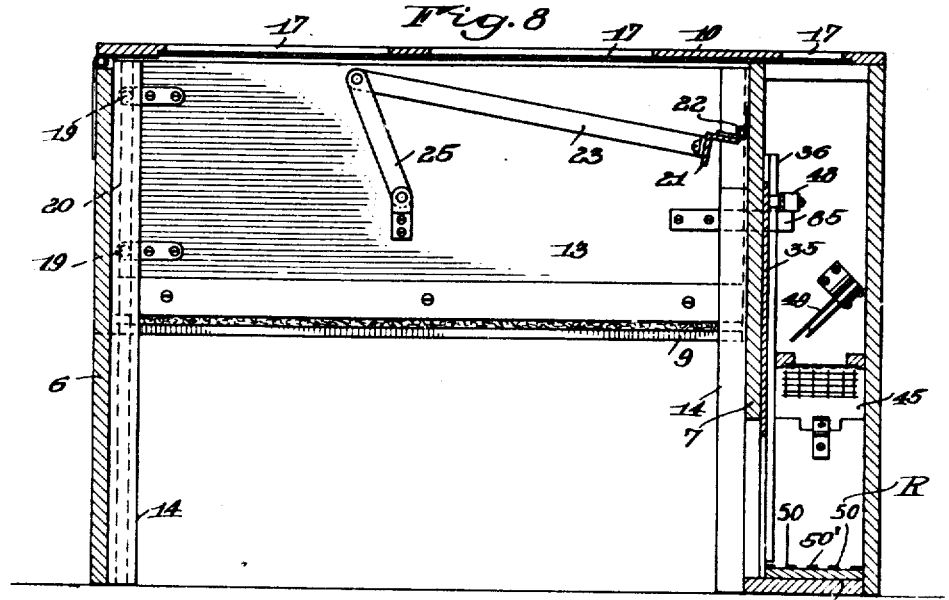
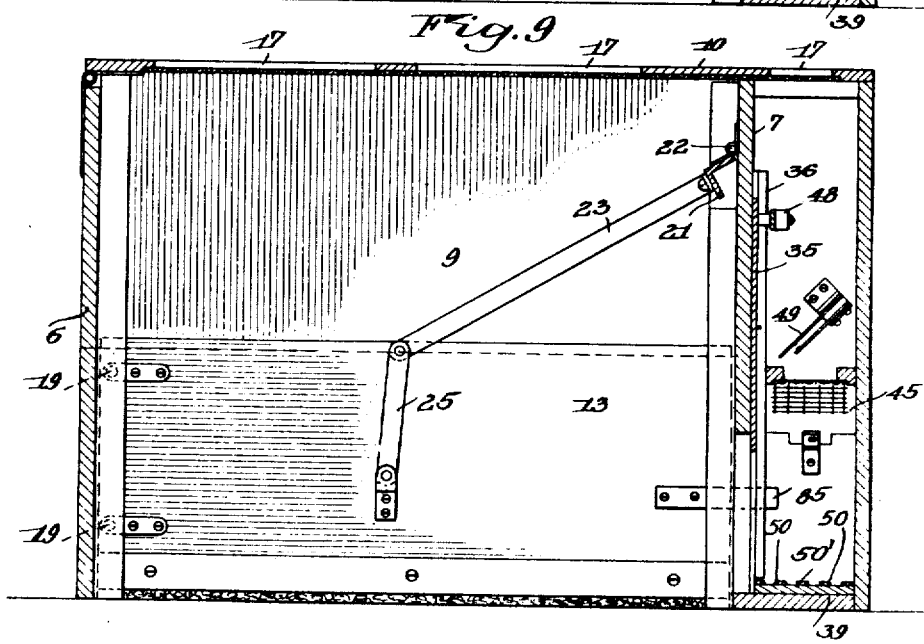

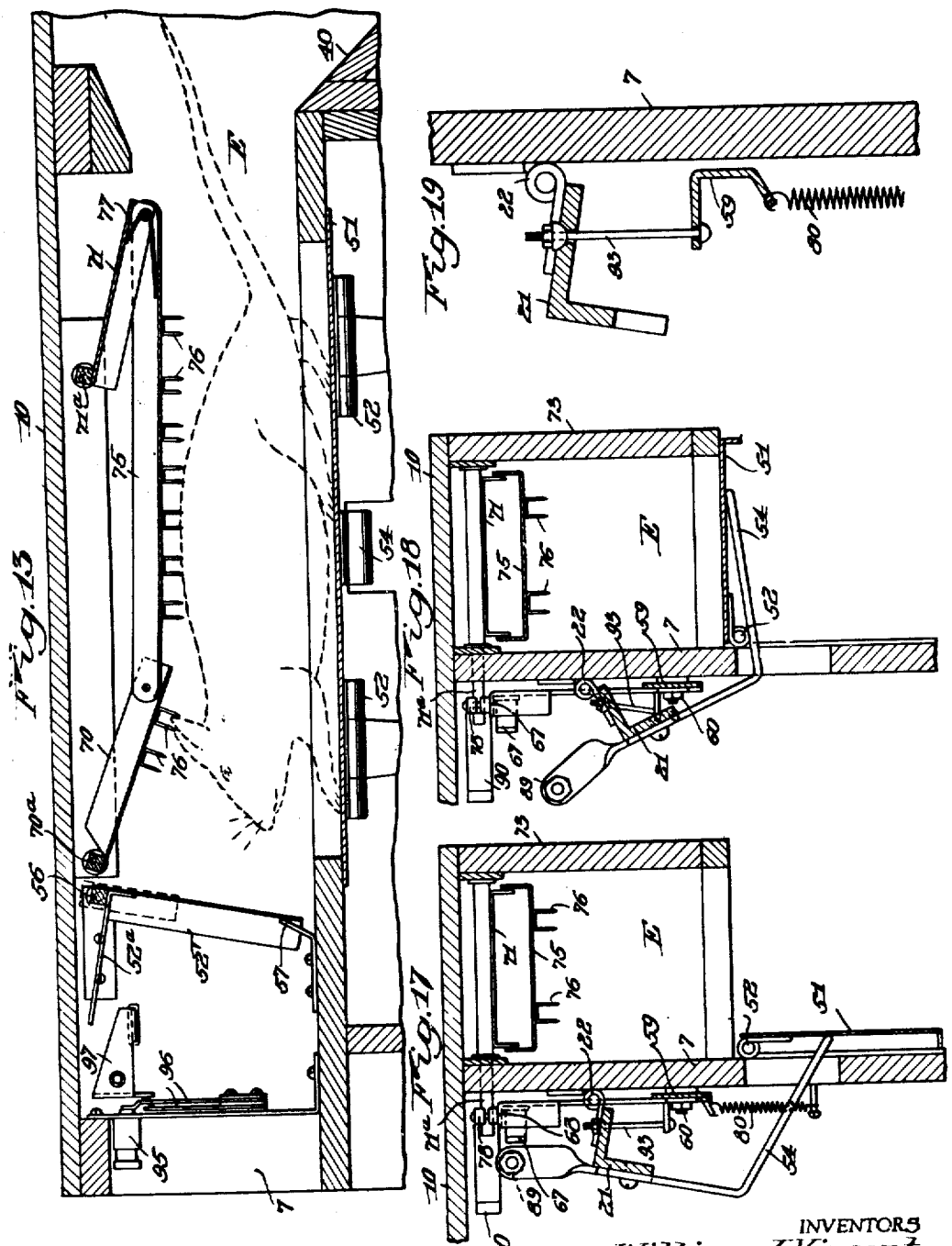

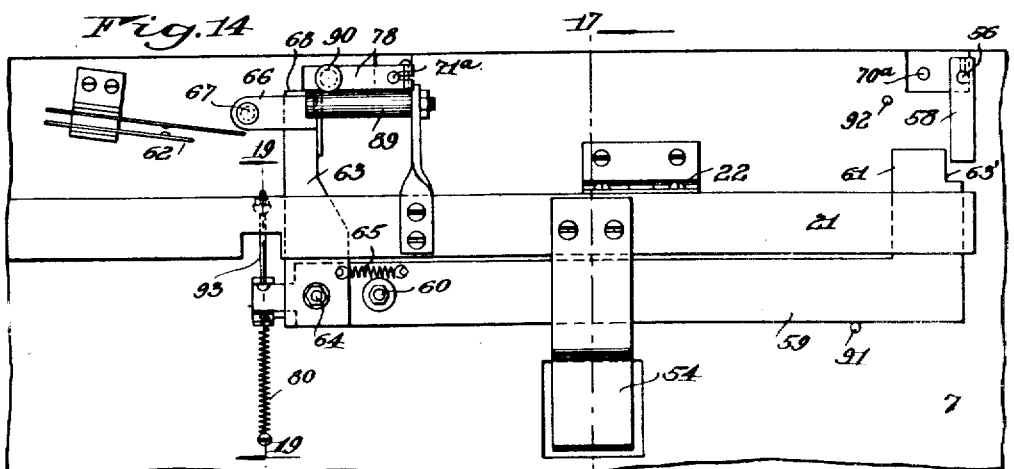
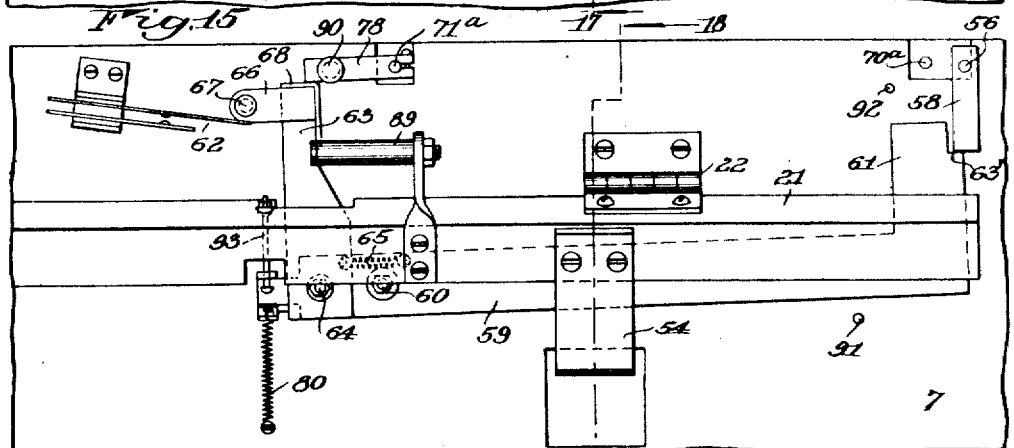
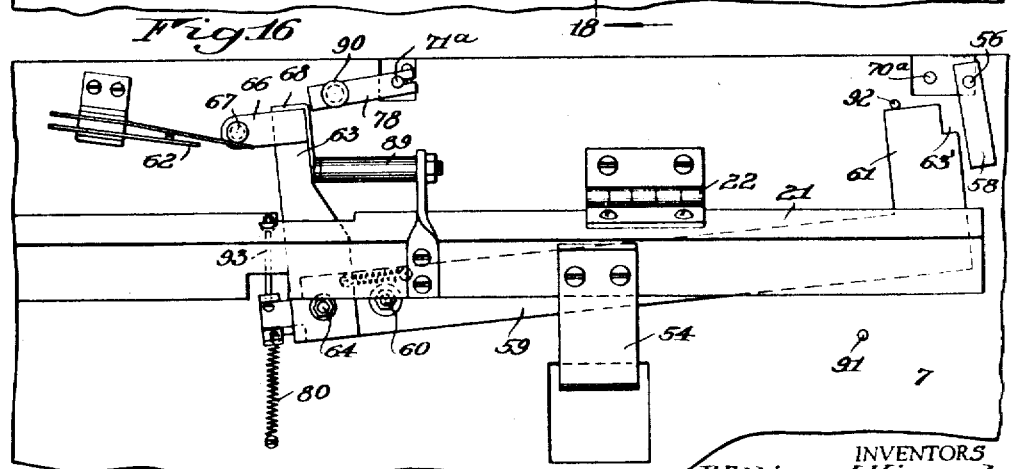

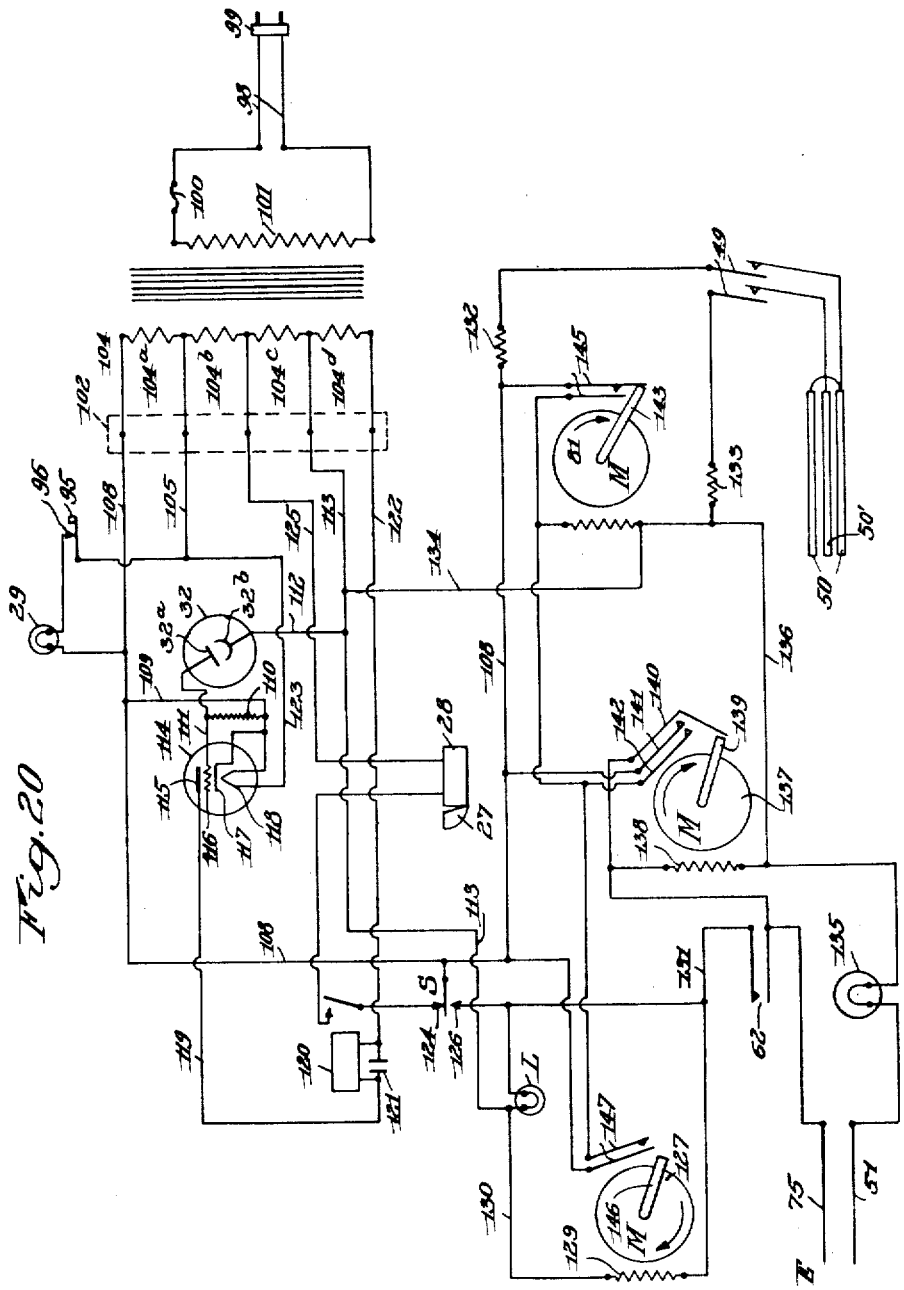

Patented Nov. 26, 1946

2,411,766

UNITED STATES PATENT OFFICE 2,411,766

ANIMAL TRAP

William J. Vincent and Cornelius M. Stanton, Rochester, N. Y., assignors, by mesne assignments, to Electronic Rat Control, Inc., Rochester, N. Y., a corporation of New York Application May 24, 1943, Serial No. 488,280

27 Claims. (Cl. 43—99)

This invention relates to an animal trap.

In our prior Patent No. 2,247,931 there is disclosed an animal trap which is particularly designed for the capturing of rats and similar animals. In that trap, the animal was captured as a result of his intercepting a beam of light or as a result of his body changing the characteristics of an electrical network. After the animal was thus captured, it was killed, or otherwise disposed of, and the trap was automatically reset for further action. All of this was accomplished in a predetermined cycle of trap operations, all conditioned by the advance of the animal through a predetermined course. If the animal failed to advance along the course in the predetermined manner, it was possible for the trap, in rare instances, to fail in its automatic resetting operation, and consequently the trap would be out of service until an attendant reset it. Such failure in the operation of the trap might arise from the fact that the rat would not proceed to the execution chamber or the rat might be accidentally caught under one of the doors which close the ends of the main or capturing chamber of the trap. Also, in that form of the previous trap wherein the animals were electrocuted in individual stalls, it frequently happened that all of the stalls became filled between visits of the attendant. While, of course, the number of stalls could be increased, this would result in making the trap unnecessarily large.

In accordance with the present invention, there is provided an improved animal trap in which novel construction is provided to effect a substantial reduction in the overall length of the trap. Furthermore, there has been provided additional mechanism which insures greater reliability in operation. As another feature, provision is made to hurry the animal into the electrocution chamber, thereby reducing the overall time of the operating cycle so that the trap will be ready to capture another animal with a minimum delay. Still another feature of the invention relates to the aplication of the electrocution current to the animal for a predetermined interval, which interval is insufficient to cause burning of the flesh of the animal which would result in objectionable odors. In addition, in the trap of the present invention, the execution chamber has been improved to insure that the electrodes of the electrocuting circuit shall have intimate electrical contact with the body of the rat, irrespective of the size of the rat.

As an additional feature, the animal, after it has been executed, is discharged from the execution chamber into a basket or other receptacle placed under this chamber so that it can be easily removed without disturbing the trap in any way.

In the drawings:

Fig. 3 is a top view of the trap with its cover opened;

Fig. 3a is an enlarged fragmentary view of the latch mechanism of Fig. 3;

Fig. 3b is a vertical section taken on the line 3b—3b of Fig. 3a;

Fig. 4 is a longitudinal vertical section on the line 4—4 of Fig. 3;

Fig. 5 is a vertical section taken substantially on the line 5—5 of Fig. 3 showing the door to the ramp chamber as well as the trap door in the bottom of the execution chamber in their opened positions;

Fig. 6 is a view similar to Fig. 5 except that the mentioned ramp door and the trap door of the execution chamber are closed;

Fig. 7 is a section taken on the line 7—7 of Fig. 5, particularly showing the floor of the ramp chamber having conducting strips adapted to be charged electrically to hurry the rat on to the execution chamber;

Fig. 8 is a vertical section taken substantially on the line 8—8 of Fig. 5, showing one of the doors of the capturing chamber in open position and also showing means for raising and lowering this door, as well as means for raising the door leading into the ramp chamber;

Fig. 9 is a view similar to Fig 8 except that the door of the capturing chamber is illustrated in its closed position;

Fig. 11 is a fragmentary top view of the execution chamber with the cover of the trap opened, particularly showing the mounting of the upper execution electrode;

Fig. 12 is a view partially in section on a line 12—12 of Fig. 11 illustrating the mounting of the upper execution electrode and a portion of the means for tripping it;

Fig. 13 is a view similar to Fig. 12 showing the position of the upper execution electrode after it has been tripped and illustrating how this electrode is adapted to position itself in accordance with the size of the captured rat;

Figure 1:
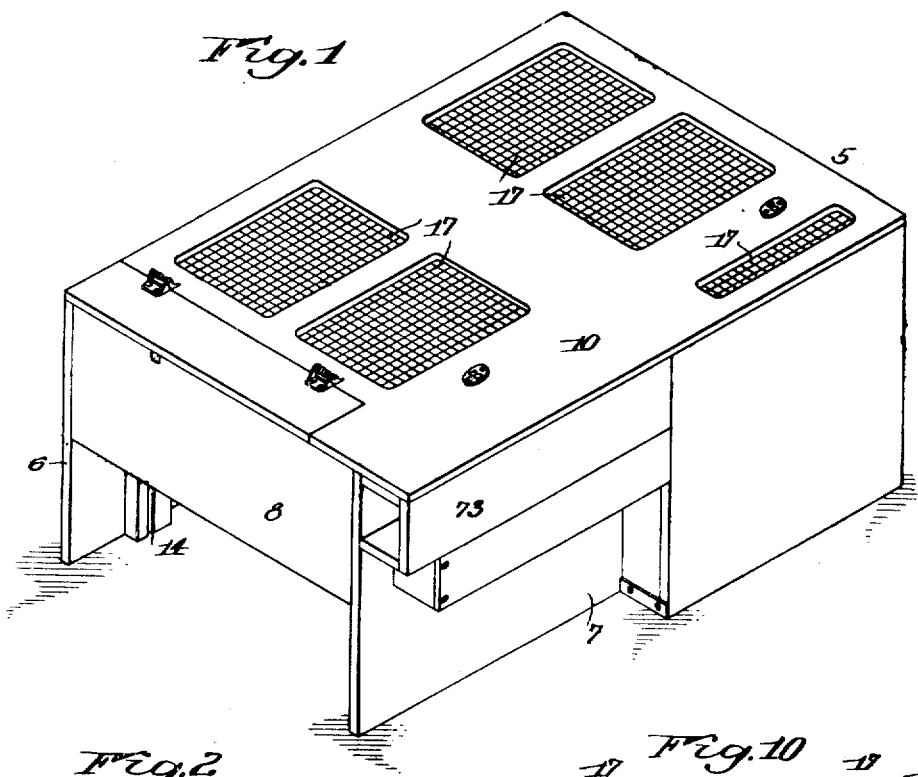
Fig. 1 is an isometric view of the trap of the present invention.

Figs. 14, 15 and 16 are different views of the latch mechanism which controls the positioning of the upper execution electrode and also controls the operation of a switch which effects the completion of the circuit for electrocution current; Fig. 14 shows the latch mechanism in its normal position when the trap is set ready to capture a rat; Fig. 15 illustrates the position of the latch mechanism after the rat has been captured but before it has entered the execution chamber; Fig. 16 shows the position of the latch mechanism after the rat has entered the execution chamber and has tripped the trigger partition in one end of that chamber;

Fig. 17 is a sectional view taken on the line 17—17 of Fig. 14 showing the position of the upper execution electrode in its normal position and also showing the bottom or trap door of the execution chamber also in its normal or open position;

Fig. 18 is a section taken on the line 18—18 of Fig. 15 showing the trap door at the bottom of the execution chamber in its closed position in readiness to receive the rat, the upper or execution electrode being still shown in its normal position in readiness to be tripped into contact with the body of the rat;

Fig. 19 is a section view on the line 19—19 of Fig. 14 showing the link connection between the main angle bar and the latch mechanism; and Fig. 20 is a diagrammatic showing of certain parts of the trap and the circuits for use with these parts.

The present trap comprises a generally rectangular box 5, preferably without a floor, but having sides 6 and 7, as well as ends 8 and 9, to constitute a capturing chamber C closed by a hinged cover 10. The lower portion of each of the ends 8 and 9 of the box is provided with an opening the full width of the box to provide a substantially unobstructed course through the trap. These openings are closed by vertically sliding doors 12 and 13, adapted to be dropped by gravity in suitable guides 14, under the control of certain door actuating mechanism. Part of this mechanism is housed in a compartment 16 adjacent the top of the box near its mid-portion. In addition to the capturing chamber C, the trap has a ramp chamber R and an execution chamber E attached to the side wall 7 so that these chambers communicate with each other in the order named. It will be noted that the cover 10 which also serves as a closure for the tops of the chambers R and E is provided with a number of openings 17 closed by wire screening. This screening permits the interior of the capturing chamber C and the ramp chamber R to share the room illumination. Thus, the bottom of the capturing chamber since it preferably has no floor of its own and since its doors 12 and 13 are normally open, seems to be but a part of the rat runway which is the floor of the room in which the trap is located.

It has been mentioned that the openings at the end of the trap are closed by the doors 12 and 13. In order to insure that each door will not bind during its sliding movement, it is provided at one edge with a pair of spaced rollers 19 that travel in a track 20 (Fig. 3). The means for raising and lowering these doors comprises an angle bar 21 which is hinged at points 22, 22 on the side wall 7 and which extends substantially the whole length of the trap. This bar is provided at each end with an arm 23 rigidly connected thereto, each arm having its free end extending slightly beyond a point above the middle of its related door. The free end of each arm 23 is pivotally connected to one end of a link 25 which has its other end pivotally mounted on its related door at slightly below the geometric center thereof. The bar 21 is normally retained in its elevated position by a latch bar 26 secured thereto. This latch bar extends into the apparatus compartment 16 where it terminates in a spring latch 26a which is engaged by a movable catch 27 controlled by the magnet 28a within the magnet case 28. The arrangement is such that when the magnet is operated, the catch 27 disengages the spring latch 26a to release latch bar 26, permitting the bar 21 with its attached doors 12 and 13 to drop to their lowermost positions.

Figure 2:
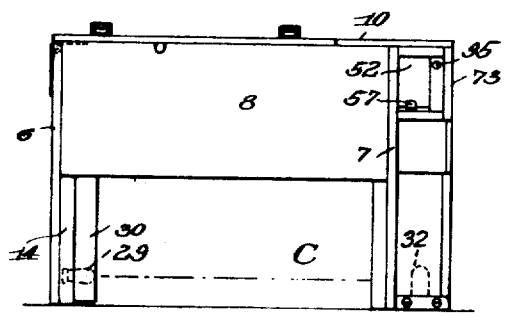
Fig. 2 is an end view showing the trap set in readiness to catch a rat and also indicating, by a broken line, the beam of light or other energy which is intercepted by the rat to trip the trap.
Figure 10:
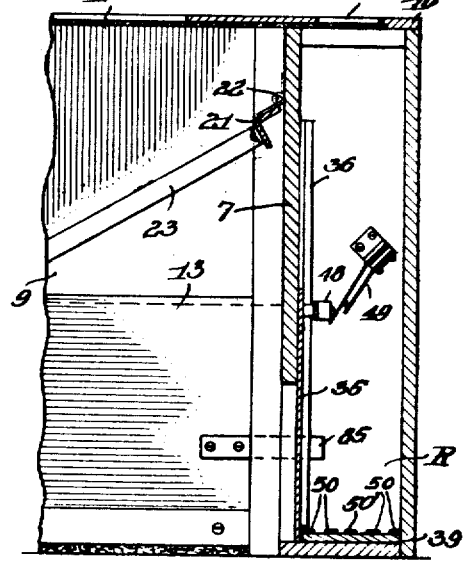
Fig. 10 is a fragmentary sectional view taken on the line 10—10 of Fig. 6 and similar to Fig. 9 particularly illustrating the door to the ramp chamber in its closed position and also indicating how this door closes a switch in a circuit that charges the conducting plates on the floor of the ramp chamber.

The tripping of the magnet is controlled by a light beam or the like which the rat intercepts in attempting to pass through the capturing chamber C. This beam originates in an incandescent lamp or suitable infra-red source 29 enclosed in a housing 30 mounted on the side wall 6. The housing has an opening 31 therein so that the beam, represented by the broken line in Fig. 2, projects across the capturing chamber C and through an opening 31' in the wall 7 thereof, normally to impinge on a photo-electric cell 32 or a like energy responsive device, housed in a case 33 in the ramp chamber R (Figs. 5 and 6). This photo-electric cell controls means for completing a circuit, to be described, including the magnet 28 so that when the light beam is interrupted, the magnet will release its catch 27 to disengage the latch 26, permitting the doors 12 and 13 to drop under the action of gravity.

It has been found that if the capturing chamber is suddenly illuminated after the animal has been captured, he will attempt more quickly to escape or to hide himself in a dark recess. Thus, illuminating the capturing chamber will tend to hurry the animal on to the execution chamber E. The mentioned illumination is effected by a dome light L, so mounted in the apparatus compartment 16 that its rays will project through a window 34 to floor the capturing chamber with light. The circuit for this dome light is completed by the switch S (Fig. 3) which is closed by the bar 21 when it rocks to drop the doors 12 and 13.

It has been mentioned that when the dome lamp floods the compartment with light, the rat will seek to get away, and therefore the present trap provides what appears to be a path of escape. For this purpose, the capturing chamber C communicates with the ramp chamber R through an opening in the side wall 7 which is closed by a door 35 adapted to slide vertically in suitable channels 36. This door is normally retained in its elevated or opened position by a weighted hook 37 (Figs. 5 and 6) pivotally mounted on the side wall 7 in a position to engage a latch 38 mounted on the door. The ramp chamber has a portion with a level floor 39 and a portion with an inclined floor leading to the execution chamber E. A part 42 of the inclined ramp floor is movable being pivoted to swing about the horizontal pivot 43, but is normally retained in the position shown in Fig. 5 by a coil spring 44. It will be noted by the upper end of this movable ramp floor is connected by a link 46 to the lower end of the hook 37 so that, when the upper end of the movable ramp floor is rocked downward due to the weight of the rat thereon, the hook will be disengaged from the latch on the door 35. Thus, the door 35 will immediately close the opening into the capturing chamber C to block the return of the rat. The upper surface of the movable ramp section preferably is covered with a rather course wire screening 47 to afford good traction whereby the rat can climb quickly up the ramp and into the execution chamber E. A ceiling 45 made partly of wire screening to permit light to pass therethrough, limits the movements of the rat in the ramp chamber.

It has been mentioned how the capturing chamber C is flooded with light so that the captured rat will attempt to escape and in so doing rushes into the ramp chamber R. As soon as the rat steps on the upper part of the movable ramp floor 42 with the resultant dropping of the door 35, a lug 48 carried on this door, actuates an electrical switch 49. This switch completes a circuit, as will be hereinafter described, so that electrical conducting strips 50 and 50', both on the flat floor 39 and on the inclined ramp floor 40, are electrically charged. The rat on bridging these strips will feel a prickling sensation due to their being charged so that he will hurry away therefrom and in so doing will pass into the execution chamber E.

The bottom of this execution chamber is closed by a metal trap door 51 which is hingedly mounted at 52, 52 on the side wall 7. The trap door 51, which serves as one of the electrocution electrodes, normally remains open but at the time that the main doors 12 and 13 of the capturing chamber are closed, this trap door will also be closed. This closure is effected by the rocking movement of the main bar 21 which is provided with an arm 54 engaging the bottom of the trap door 51. Thus, when the bar 21 rocks to drop the main doors, it also operates to elevate and close the trap door 51. The end of the execution chamber E is closed by a partition-like trigger 52', adapted to have limited swinging movement on its trunnions 56, as determined by a fixed stop 57. One of these trunnions extends through the side wall 7 (Fig. 11) where it has fixedly mounted thereon a catch 58. This catch cooperates with a latch bar 59 which extends along and is pivoted at 60 on side wall 7. This latch bar 59 with its several parts to be described, controls the raising as well as the lowering of a second execution electrode and also operates a switch 62 governing the application of electrocution current.

The latch bar 59 is provided with an integral upright 61 having a notch 63' therein, this notch being adapted to cooperate with the catch 58. The other end of the latch bar has an upright member 63 pivoted thereon at 64, for limited movement with respect thereto. A coil spring 65 tends to maintain this upright member 63 in right angle relation to the latch bar, but permits limited motion between these parts during the restoring operation of the latch bar. The upright member carries an arm 66, which is provided with a lug 67 serving in its lower position to close a switch 62, as shown in Fig. 16. The upright member terminates at its upper end in a stop 68, which functions to hold the execution electrode in its normal position, as will presently be described. The upper or second execution electrode, which approximates a parallelogram linkage, comprises two spaced metal plates 70 and 71 approximately equal in width to that of the execution chamber, each plate being pivoted on suitable trunnions 70a and 71a, bearing in the side wall 7 of the trap and in the outside wall 73 of the execution chamber. The other ends of the plates 70 and 71 are pivotally connected to the respective ends of a metal plate 75 which is, roughly, as wide and as long as the execution chamber E. The under surface of the plates 70 and 75 are provided with spaced metal prongs 76 which extend downward and are designed to pass through the fur of the rat into good electrical engagement with the rat's body. A hair-pin spring 77 mounted between the plates 71 and 75 normally urges the mentioned upper electrode linkage downward into contact with the body of the rat, as shown in Fig. 13. Thus, this upper electrode adjusts itself in accordance with the size of the rat in the execution chamber. It has been mentioned that the second execution electrode or linkage is normally retained in its uppermost position, as shown in Fig. 12. This is effected by a crank 78 fixed on the end of the trunnion 71a where it extends through the wall 7 of the trap. This crank is adapted to engage the stop 68 on the upright member of the latch bar when this mechanism is in its normal position, as shown in Fig. 14 and also in its position shown in Fig. 15, which position illustrates the condition of the trap after a rat has been captured but before it has passed into the execution chamber. However, after the rat has passed into this chamber and when the rat contacts the trigger partition 52', the catch 58 disengages the notch 63' in the latch bar. The coil spring 80 rocks the latch bar against stop 92 in the position shown in Fig. 16 where the stop 68 on the upright member of this mechanism disengages the crank 78 carried by the trunnion 71a forming a part of the second execution electrode. When thus released, this electrode will assume the position shown in Fig. 13. The switch 62 controlled by the latch mechanism, as described, completes the circuit for applying electrocution current, which current is supplied for a predetermined interval for example, three minutes, after which the electrocution current is disconnected from the electrodes, as will be set forth in the course of the description of the circuits of Fig. 20.

The trap can now be automatically reset in readiness to capture another rat. For the purpose of effecting this resetting operation, there is provided a motor 81 in the apparatus compartment, which motor operates through a suitable train of gears 82 to turn a crank 83. This crank, in the course of its rotation, engages the under side of the latch 26 to rotate the bar 21. As this bar 21 is rotated, it elevates the end doors 12 and 13 by reason of the arms 23 and the links 25 respectively connected to the bar and to the doors. The latch 26 is retained in its upper position by the catch 27 which is governed by the door controlling magnet 28. As the door 13 is elevated, an arm 85 thereon (Fig. 8) engages a projection 86 (Fig. 5) on the door 35 to the ramp chamber, restoring this door to the position shown in Figs. 5 and 8. When the ramp door 35 is elevated to its normal position, its lug 48 disengages and therefore opens the switch 49 which has completed the circuit for charging the strips 50 and 50' on the floor of the ramp chamber. It will be recalled that the rat, in contacting these charged strips, is shocked so that he hurries into the execution chamber. As the angle bar 21 rotates, its bracket 54 withdraws from the under side of the trap door 51 so that this door drops from its closed position, as shown in Fig. 18, to its open position, illustrated in Fig. 17, thereby dropping the electrocuted rat out of the execution chamber. Also, the rotation of the angle bar 21 brings its roller 89 into contact with the roller 90 carried on the crank arm 78 which, it will be recalled, is attached to the trunnion 71a, forming a part of the second execution electrode or linkage. The raising of the mentioned rollers 89 and 90 elevates this linkage to the position shown in Fig. 12. Since the crank 78 and the roller 90 are raised at this time to their uppermost position, best shown in Fig. 14, the stop 68 on the upright member of the latch mechanism moves under the crank attached to the execution electrode linkage being swung to this position by the coil spring 65. It will be understood that as the angle bar 21 is rotated, it operates through the link 93 to rock the latch bar 59 until it strikes the stop 91. Also, when the angle bar is restored, its lug 94 (Fig. 3) actuates the switch S to open the circuits for the dome light L and others which will appear from the following circuit description.

It is sometimes desirable for a service man to test the operation of the trap so that it will proceed through its cycle of operations in the same manner as if a rat had been captured. In order to effect this result, there is provided a test key 95 (Figs. 12 and 13) which key when depressed opens the contact springs 96 to interrupt the circuit of the lamp 29 (Fig. 20). Since this will extinguish the lamp, it simulates the condition where the rat intercepts the beam of light for the photo-electric cell 32. Consequently, the photo-electric cell and its related equipment will function in the same manner as if initially actuated by the action of the rat. Also, the test key 95 operates a cam plate 97 having an inclined surface. This surface engages an extension 52a on the partition-like trigger 52' to swing this trigger to the position shown in Fig. 13. In other words, the cam-like surface will operate the trigger in the same manner as if it had been moved by a rat. Consequently, the trap will proceed through the remainder of its cycle of operation to the position wherein it is reset.

In the foregoing description of the trap, mention has been made of the circuits for controlling the various parts thereof. The trap is provided with an electrical cord comprising a pair of conductors 98 adapted to be connected by a suitable plug 99 to a commercial power source such as a source of 60 cycle 110 volt current. The conductors 98, as shown in Fig. 20, are connected through a two-ampere fuse 100 to the respective terminals of the primary winding 101 of a transformer, which winding should preferably be electrically insulated from the secondary windings as a safety measure. For convenience, the two-ampere fuse may be mounted in an outlet box 103, shown in Figs. 3 and 4 of the drawings. The secondary winding 104 of the transformer T is provided with a series of taps connected to various terminals of terminal strip 102 (Figs. 3 and 20) whereby voltages of various values may be derived therefrom. The portion 104a of this winding provides a five volt source which is normally applied to the lamp 29 in order to project a light beam on the photo-electric cell 32. The circuit for this lamp extends from the five volt source, conductor 105, thence through the manual test switch 95, lamp 29 and finally to the common ground conductor 108. It has also been mentioned that the light from the lamp 29 is projected on the photo-electric cell 32. This cell has its electrodes 32a and 32b connected in a circuit including the conductors 108 and 109, through the twenty megohm resistor 110, conductor 111, to the electrode 32a of the cell. The other electrode 32b thereof is connected through the conductors 112 and 113 to the one-hundred-ten volt transformer winding. The output of the photo-electric cell is connected to an amplifier tube 114 having an anode 115, a grid 116, a cathode 117 and a heater 118. The output of the photo-electric cell is connected directly through the conductor 111 to the grid 116 of the amplifier while the cathode 117 of the amplifier is connected through the conductor 109 to the ground conductor 108 thereby completing the input circuit of the amplifier. The output circuit of the amplifier may be traced from the anode 115 thereof, conductor 119, winding of relay 120 (which relay is enclosed in case 120a (Fig. 3) and has connected thereacross a four MF condenser 121) and conductor 122 to the terminal of the transformer from which there is derived a voltage of two-hundred-ten volts. It should be mentioned that the three-hundred-twenty volt winding 104d of the transformer and the one-hundred-ten volt winding 104c are arranged in opposition so that the net voltage of this combination is the difference between three-hundred-twenty volts and one-hundred-ten volts, that is, a voltage of two-hundred-ten volts. The heater 118 of the amplifier is connected in multiple with the lamp 29, its circuit being traceable from the the ground conductor 108, conductor 109, heater 118, conductors 123 and 105 to the five volt source.

It will be understood that under normal conditions, when there is no rat in the trap, the light from the lamp 29 will fall on the photo-electric cell 32. This will cause uni-directional pulsating current to flow between the electrodes 32a and 32b on each positive half-cycle of the alternating current supplied by the transformer. As a result of the connection between the photo cell electrode 32a and the grid 116 of the amplifier, this grid is maintained sufficiently negative so that substantially no plate current will flow in the output circuit of the amplifier. Consequently, the relay 120 connected in this output circuit will not operate. However, when the light beam from the lamp 29 is intercepted so that it does not fall on the photo-electric cell, this cell will immediately become non-conducting. The twenty megohm resistor 110 will therefore operate as a grid-leak so that the negative voltage on the control grid 116 will quickly leak away. This will enable pulsating plate current to flow in the output circuit of the amplifier so that the relay 120 in this circuit will operate. It should be mentioned that the condenser 121 becomes charged during the period that plate current flows through the relay 120 and this condenser discharges in the interval when the pulsating current is not flowing, the discharge being through the relay 120 in a direction to maintain it operated. As soon as the relay 120 is operated, it closes the operating circuit of the latch controlling magnet 28, which circuit extends from the ground conductor 108, gate switch contact 124 of the gate switch S (Fig. 3), armature and front contact of relay 120, winding of the latch controlling magnet, conductor 125 to the terminal to which the windings 104a and 104b of the transformer are connected in series so that a voltage of substantially eleven volts is supplied. The latch controlling magnet 28 operates in the manner previously described to lower the gates 12 and 13 at the respective ends of the capturing chamber C. When this is done, the gate switch is operated to interrupt its contact 124 and to close its contact 126. On the closure of the contact 126, a circuit is completed for the dome light L which floods the capturing chamber with light. Also, the fifteen minute timer is started to insure restoration of the trap to its reset position in the event that there has been any failure in the cycle of operations of the trap. The circuit for the dome light L extends from the ground conductor 108, gate switch contacts 126, now closed, through the lamp L, conductor 113 and the one-hundred-ten volt winding of the transformer. Also, the motor 127 of the fifteen minute timer is operated in multiple with lamp L so that it starts measuring a fifteen minute interval. It should be pointed out that the motor 127 winds up a spring (not shown) as it operates so that when current to the motor is interrupted, the motor is restored to normal by the spring.

As soon as the capturing chamber is flooded with light by the lamp L, the captured rat scurries into the ramp chamber R where he steps on the movable portion of the ramp floor. This causes the door 35 of the ramp chamber to close. The door 35, on dropping, closes switch 49. This switch completes a circuit for electrically charging the strips 50 and 50'. The charging circuit extends from the conductor 108 through the fifteen thousand ohm resistor 132, the switch 49 to one set of conducting strips 50 and from the other set of conducting strips 50' through the switch 49 and the fifteen thousand ohm resistor 133, conductors 134 and 113 to the hundred-ten volt source. It will be remembered that the charged strips 50 and 50' tend to hurry the rat into the execution chamber E where he strikes against the partition trigger 52', which, among other operations, closes the switch 62. Electrocution current will then be supplied from the ground conductor 108, gate switch contacts 126, conductor 131, switch contacts 62 and to the upper execution electrode (including the linked plates 70, 71 and 75), thence through the body of the rat, the lower execution electrode or trap door 51 and the current limiting lamp 135, conductors 136, 134 and 113 to the one-hundred-ten volt winding. It will be understood that the lamp 135 limits the amount of current flowing through the body of the rat thereby insuring that the rat will not be burned. Also, as soon as the switch 62 is closed, a circuit is completed for the three-minute timer 137. This circuit is traceable from the ground conductor 108, gate switch contacts 126, conductor 131, switch 62, field winding 138 of the timer motor, conductors 136, 134 and 113 to the one-hundred-ten volt winding.

As soon as the three-minute timer is advanced from its normal position, as a result of the completion of its initial operating circuit, the lug 139 carried by the motor disengages the contact spring 140 allowing it to engage contact spring 141. However, contact spring 142 remains open at this time. As a result of the contacting of the springs 140 and 141, a substitute circuit is completed for the motor 137, over conductor 108, contacting springs 140 and 141, field winding 138 of the motor and thence over the conductors 136, 134 and 113, as previously described. Under the control of this circuit, the motor 137 of the timer measures a period of three minutes during which the electrocution current is applied to the rat. At the conclusion of this three minute interval, the lug 139 temporarily moves the contact spring 142 into engagement with contact spring 141 after which this lug moves to the position shown wherein the contact springs 140, 141 and 142 are out of engagement. As soon as the springs 141 and 142 are in contact, a circuit is completed for the lift motor 81, the circuit extending from the ground conductor 108, springs 141 and 142 now closed, field winding of the motor 81, conductors 134 and 113 to the other terminal of the one-hundred-ten volt source. Under the control of this circuit, the lift motor operates through the train of gears 82 to turn its crank 83 in a direction to rotate the latch 26 upward. As soon as the lift motor is rotated off normal, it moves its cam 143 away from the contact springs 145 so that they move into engagement. The operating circuit for the lift motor is now completed independently of the contacts 141 and 142 on the timing motor 137. This new operating circuit is traceable from ground conductor 108, contact springs 145, field winding of the lift motor, conductors 134 and 113 to the other terminal of the current source. Under the control of this circuit, the lift motor restores the parts of the trap to their normal position and when the lug 143 on the shaft of the motor 81 opens the contact springs 145, the lift motor stops in its normal position.

It will be understood that the fifteen minute interval timing motor 127 starts to wind up its spring every time that the trap is operated. If the trap proceeds through its normal cycle of operations, the operating circuit of the motor 127 will be interrupted by the contacts 126 of the gate switch S before the completion of the fifteen minute interval. Consequently, the spring of the timing motor will restore it to its normal position. If, however, the trap is not reset in the fifteen minute interval, the lug 146 carried on the shaft of this motor will close the normally open contact springs 147. The closure of these springs will complete an initial operating circuit for the lift motor 81. This circuit extends from the ground conductor 108, contact springs 147, now closed, field winding of the motor 81, conductors 134 and 113 to the other terminal of the current source. The lift motor 81 will thus be initially energized, and when it rotates from its normal position, its contacts 145 will close to complete a substitute operating circuit for this motor so that it operates through its cycle. This will reset all parts of the trap in readiness to capture another rat.

We have discovered that a definite ratio beteen the current value and the period during which it is applied are important in effecting complete electrocution of the animal. In a series of tests performed, a rat was subjected to voltages as high as 400 volts for a period of fifteen seconds. While this caused burning of the flesh and fur of this rat with the resulting stench, the animal quickly revived. In accordance with the present invention relatively low voltage of the order of 110 to 130 volts is applied to the rat for a period of from two to three minutes. In practice, it is desired to apply the curent for at least three minutes in order to afford a wider margin of safety since it has been found that the age of the rat seems to determine to some extent the length of the time that the current must be applied to cause death. With the controlled or limited current of the mentioned low voltage, there is no mutilation of the rat and no burning of flesh as well as minimum electrical hazard to users.

What we claim is:

1. In an animal trap, a cabinet provided with a capturing chamber, a ramp chamber and an execution chamber communicating with each other in the order named, said capturing chamber being provided with at least one door opening to the outside thereof and with a door communicating with said ramp chamber, means responsive to the presence of an animal in the capturing chamber for closing said first-mentioned door to capture the animal, means responsive to the presence of the captured animal in said capturing chamber for hurrying the animal into the ramp chamber, means actuated by the captured animal in the ramp chamber for closing the door leading from said ramp chamber to said capturing chamber, means responsive to the presence of the captured animal in the ramp chamber for hurrying said animal into the execution chamber, and mechanism actuated by the captured animal in the execution chamber for applying electrocution current to the animal therein for a predetermined time.

2. In an animal trap, a cabinet provided with a capturing chamber, a ramp chamber and an execution chamber communicating with each other in the order named, said capturing chamber being provided with at least one door opening to the outside thereof and with a door communicating with said ramp chamber, means responsive to the presence of an animal in the capturing chamber for closing said first-mentioned door to capture the animal, means responsive to the presence of the captured animal in said capturing chamber for hurrying the animal into the ramp chamber, means actuated by the captured animal in the ramp chamber for closing the door leading from said ramp chamber to said capturing chamber, means responsive to the closure of said last-mentioned door for applying a stimulus to the captured animal in the ramp chamber for hurrying said animal into the execution chamber, mechanism actuated by the captured animal in the execution chamber for applying electrocution current to the animal therein for a predetermined time, and means for discharging the executed animal from said execution chamber.

3. An animal trap comprising capturing mechanism tripped by the animal, restoring means for resetting the capturing mechanism in readiness to capture another animal, a source of electrocuting current, means including a timing device operated in response to the presence of the animal in the execution chamber for applying said electrocuting current to said animal for a predetermined period of time, means including said timing device operative at the conclusion of said period for initiating the operation of said restoring means, a secondary timing device, the operation of which is initiated in response to the capturing of the animal, said secondary device serving to measure a longer period of time than said first timing device, and means including said secondary timing device for actuating said restoring means in the event that it has not been operated under the control of said first timing device.

4. In an animal trap, means for capturing an animal, means for electrocuting the captured animal comprising a pair of electrodes and a source of electric current connected thereto, and means actuated by the presence of the captured animal between said electrodes for causing at least one of the electrodes to approach the other until it engages said captured animal.

5. In a trap, means for capturing an animal, an execution chamber for electrocuting the captured animal, comprising a pair of electrodes and a source of electrocuting current connected thereto, one of said electrodes being in the form of a trap door in the bottom of the execution chamber, the other electrode being provided with at least one sharp point, and means actuated by the presence of the animal between said electrodes for causing at least one of the electrodes to approach the other whereby said point will be brought into intimate contact with the animal.

6. The method of exterminating rats or the like which comprises capturing a rat, relatively moving a pair of electrodes into contact with spaced parts of the rat's skin, and supplying the electrodes with alternating current of limited value at a voltage of the order of 110 to 130 volts, for a period of two to three minutes, one of said electrodes contacting one portion of the rat and the other electrode being impressed at multiple spaced locations in the skin of another portion of the rat.

7. The method of exterminating rats or the like which comprises capturing a rat, relatively moving a pair of electrodes into contact with spaced parts of the rat's skin, one of said electrodes contacting the bottom of the rat's feet, and the other electrode being impressed at multiple spaced points in the skin of the upper part of the rat, and supplying the electrodes with limited alternating current at a voltage of the order of 110 to 130 volts, for a period of two to three minutes.

8. The method of exterminating an animal which comprises, capturing the animal in a chamber, providing a false path of escape for the animal from said chamber to an electrocution station, subjecting the captured animal to repeated electric shocks of insufficient strength to kill it as it advances along said path to said station, electrocuting the animal at said station, and then discharging the electrocuted animal from said station responsive to the passage of a given interval of time.

9. The method of exterminating an animal which comprises, capturing the animal in a chamber, providing a false path of escape for the animal leading to an electrocution station, illuminating the captured animal to hurry it from the chamber into said false path, subjecting the animal to repeated electric shocks along said path for hurrying it to said station, and electrocuting the animal at said station by relatively moving electrically active electrodes into forced contact with spaced portions of the skin of the animal.

10. The method of exterminating an animal which comprises, capturing the animal in a chamber, providing a false path of escape for the animal from said chamber, applying a stimulus to the animal responsive to its capture for hurrying it along said path to an electrocution station, electrocuting said animal at said station by connecting one side of a current source directly to the animal's foot and by moving the other side of said current source directly into contact with the skin of the upper part of said animal for a predetermined period, disconnecting said current source from said animal at the conclusion of the period, and discharging the animal from said station.

11. An animal trap comprising capturing mechanism tripped by the animal, means operating within a given period for killing the captured animal, restoring means normally operated at the conclusion of said period for resetting said capturing mechanism in readiness to capture another animal, and supplemental means for effecting the operation of said restoring means in the event that it has not completed its operation in a given interval.

12. An animal trap comprising capturing mechanism tripped by the animal, restoring means for resetting said mechanism, a source of electrocuting current, means including a timing device for applying the electrocuting current to the captured animal for a predetermined period, means including said timing device for normally effecting the operation of said restoring means, and supplemental means for effecting the operation of said restoring means in the event that it has not completed its operation in a given interval.

13. In an animal trap, a cabinet provided with a capturing chamber and with an execution chamber communicating therewith, said capturing chamber being provided with at least one door, means responsive to the presence of an animal in the capturing chamber for closing said door to capture the animal, execution means including relatively movable electrodes in said execution chamber, mechanism actuated by the animal in the execution chamber for effecting relative movement of said electrodes into contact with said animal and for energizing said execution means, and means responsive to the actuation of said mechanism for reopening said door.

14. In an animal trap, a cabinet provided with a capturing chamber and with an execution chamber communicating therewith, said capturing chamber being provided with at least one door, means responsive to the presence of an animal in the capturing chamber for closing said door to capture the animal, means responsive to the action of said door-closing means for hurrying the animal toward the execution chamber, execution means in said execution chamber including electrode surfaces relatively movable with respect to each other to squeeze the major portion of the length of the animal's body, mechanism actuated by the animal in the execution chamber for operating said execution means, and means controlled by said mechanism for reopening said door.

15. The method of exterminating animals which comprises capturing an animal responsive to its interception of a beam of light, and subjecting the captured animal to electrocuting current applied for a given interval through electrodes relatively movable against the captured animal to contact spaced parts of the skin of the animal whereby the electrodes squeeze the animal irrespective of its size.

16. The method of exterminating animals which comprises capturing an animal responsive to its interception of a beam of light and subjecting the captured animal to electrocuting current applied for a given interval through electrodes relatively movable toward each other to contact opposing surfaces of the animal whereby the electrodes squeeze the animal irrespective of its size.

17. The method of exterminating animals which comprises capturing an animal at one position responsive to its interception of a beam of light, advancing the captured animal to a second position and subjecting the captured animal at said second position to electrocuting current applied for a given interval through electrodes relatively movable toward each other to contact opposing surfaces of the animal whereby the electrodes grip the animal irrespective of its size.

18. In a trap, a tunnel-like passageway, tripping means extending substantially across said passageway intermediate the ends thereof, mechanism actuated responsive to the animal encountering said tripping means for capturing said animal, means for electrocuting said captured animal including electrically charged spaced electrodes relatively movable against the captured animal to squeeze spaced parts thereof, and mechanism effective at the close of the electrocution of the animal for disengaging at least one of said electrodes from said animal.

19. In a trap, a tunnel-like passageway, tripping means extending substantially across said passageway intermediate the ends thereof, mechanism actuated responsive to the animal encountering said tripping means for capturing said animal at a first position and for advancing said captured animal toward a second position, means effective at said second position for electrocuting said captured animal including electrically charged spaced electrodes relatively movable against the captured animal to squeeze spaced parts thereof, and mechanism effective at the close of the electrocution of the animal for disengaging said electrodes from said animal.

20. In a trap, a tunnel-like passageway open at its ends, tripping means extending substantially across said passageway intermediate the ends thereof, mechanism actuated responsive to the animal encountering said tripping means for capturing said animal, means for electrocuting said captured animal including electrically charged spaced electrodes relatively movable one with respect to the other to squeeze spaced parts of an animal therebetween, and mechanism effective at the close of the electrocution of the animal for disengaging said electrodes from said animal.

21. In a trap, a tunnel-like passageway open at its bottom and at its ends, tripping means extending substantially across said passageway intermediate the ends thereof, mechanism actuated responsive to the animal encountering said tripping means for capturing said animal and for advancing the captured animal toward an elevated position, means effective in said elevated position for electrocuting said captured animal including electrically charged spaced electrodes relatively movable one with respect to the other to squeeze spaced parts of an animal therebetween, and mechanism effective at the close of the electrocution of the animal for disengaging said electrodes from said animal and for discharging the electrocuted animal from the trap.

22. In a trap, a tunnel-like passageway, tripping means extending substantially across said passageway intermediate the ends thereof, mechanism actuated responsive to the animal encountering said tripping means for capturing said animal and for advancing the captured animal toward a given position, means effective at said given position for electrocuting said captured animal, including electrically charged spaced electrodes, relatively movable one with respect to the other to squeeze spaced parts of the captured animal therebetween, and mechanism effective at the close of the electrocution of the animal for disengaging said electrodes from said animal and for discharging the electrocuted animal from the trap.

23. In a trap, a tunnel-like passageway, tripping means extending substantially across said passageway intermediate the ends thereof, mechanism actuated responsive to the animal encountering said tripping means for capturing said animal and for advancing the captured animal toward a given position, means effective at said given position for electrocuting said captured animal, including electrically charged spaced electrodes, relatively movable one with respect to the other to squeeze spaced parts of the captured animal therebetween, at least one of said electrodes being provided with prongs adapted to be impressed into the skin of the animal to afford improved electrical contact therewith, and mechanism effective at the close of the electrocution of the animal for disengaging said electrodes from said animal and for discharging the electrocuted animal from the trap.

24. The method of exterminating an animal which comprises, in response to action by the animal, capturing the animal and applying to the animal while yieldingly squeezing the animal's body, an electrocuting current of limited value for a predetermined interval of time to at least two portions of said body where so squeezed.

25. The method of exterminating an animal which comprises capturing the animal and electrocuting it in response to action by the animal, by applying an alternating current for a given period of time, at zones spaced longitudinally and spaced transversely of the animal's body and simultaneously restraining the animal in said zones of electrocution by squeezing the animal during the step of electrocution.

26. The method of exterminating animals which comprises capturing the animal, due to action by the animal, and connecting pairs of opposed spaced parts of the body of the animal for a predetermined time interval in a series circuit with a source of electrocuting current due to action by the animal, while simultaneously pricking the skin of the animal at one or more points, the points of connection with the areas of the animal's body being so disposed that the air gaps at the animal's body are maintained at a negligible value even when said animal relaxes due to the effect of said current, and squeezing the animal during the pricking operation.

27. The method of exterminating animals which comprises capturing the animal, and connecting the body of the animal for a predetermined time interval in series in a circuit with a source of electrocuting current in response to action on the part of the animal, and simultaneously pricking the skin of the animal and squeezing the animal for restraining the animal and for effecting good electrical contact therewith.

WILLIAM J. VINCENT.
CORNELIUS M. STANTON.

Certificate of Correction

Patent No. 2,411,766.

November 26, 1946.

WILLIAM J. VINCENT ET AL.

It is hereby certified that errors appear in the printed specification of the above numbered patent requiring correction as follows: Column 4, line 52, for "floor" read *flood*; column 5, line 1, for "noted by" read *noted that*; and that the said Letters Patent should be read with these corrections therein that the same may conform to the record of the case in the Patent Office.

Signed and sealed this 4th day of February, A. D. 1947.

[SEAL]

LESLIE FRAZER,
*First Assistant Commissioner of Patents.* disengaging said electrodes from said animal and for discharging the electrocuted animal from the trap.

23. In a trap, a tunnel-like passageway, tripping means extending substantially across said passageway intermediate the ends thereof, mechanism actuated responsive to the animal encountering said tripping means for capturing said animal and for advancing the captured animal toward a given position, means effective at said given position for electrocuting said captured animal, including electrically charged spaced electrodes, relatively movable one with respect to the other to squeeze spaced parts of the captured animal therebetween, at least one of said electrodes being provided with prongs adapted to be impressed into the skin of the animal to afford improved electrical contact therewith, and mechanism effective at the close of the electrocution of the animal for disengaging said electrodes from said animal and for discharging the electrocuted animal from the trap.

24. The method of exterminating an animal which comprises, in response to action by the animal, capturing the animal and applying to the animal while yieldingly squeezing the animal's body, an electrocuting current of limited value for a predetermined interval of time to at least two portions of said body where so squeezed.

25. The method of exterminating an animal which comprises capturing the animal and electrocuting it in response to action by the animal, by applying an alternating current for a given period of time, at zones spaced longitudinally and spaced transversely of the animal's body and simultaneously restraining the animal in said zones of electrocution by squeezing the animal during the step of electrocution.

26. The method of exterminating animals which comprises capturing the animal, due to action by the animal, and connecting pairs of opposed spaced parts of the body of the animal for a predetermined time interval in a series circuit with a source of electrocuting current due to action by the animal, while simultaneously pricking the skin of the animal at one or more points, the points of connection with the areas of the animal's body being so disposed that the air gaps at the animal's body are maintained at a negligible value even when said animal relaxes due to the effect of said current, and squeezing the animal during the pricking operation.

27. The method of exterminating animals which comprises capturing the animal, and connecting the body of the animal for a predetermined time interval in series in a circuit with a source of electrocuting current in response to action on the part of the animal, and simultaneously pricking the skin of the animal and squeezing the animal for restraining the animal and for effecting good electrical contact therewith.

WILLIAM J. VINCENT.
CORNELIUS M. STANTON.

Certificate of Correction

Patent No. 2,411,766.  November 26, 1946.

WILLIAM J. VINCENT ET AL.

It is hereby certified that errors appear in the printed specification of the above numbered patent requiring correction as follows: Column 4, line 52, for "floor" read *flood*; column 5, line 1, for "noted by" read *noted that*; and that the said Letters Patent should be read with these corrections therein that the same may conform to the record of the case in the Patent Office.

Signed and sealed this 4th day of February, A. D. 1947.

[SEAL]

LESLIE FRAZER,
*First Assistant Commissioner of Patents.*